United States Patent [19]

Woods et al.

[11] 4,319,299

[45] Mar. 9, 1982

[54] COMBINATION STARTER-PROTECTOR DEVICE, APPARATUS UTILIZING SUCH DEVICE, AND METHODS OF ASSEMBLING

[75] Inventors: Lee O. Woods, Morrison; Donald L. Haag, Sterling, both of Ill.

[73] Assignee: General Electric Company, Fort Wayne, Ind.

[21] Appl. No.: 143,029

[22] Filed: Apr. 23, 1980

[51] Int. Cl.³ .......... H02H 5/04

[52] U.S. Cl. .......... 361/24; 339/91 R; 339/209; 361/26; 361/105; 361/331

[58] Field of Search .......... 361/24, 25, 26, 27, 361/29, 105, 106, 331, 380, 392; 338/220; 339/91 R, 139 R, 196, 209; 337/380; 335/132; 200/303, 307

[56] References Cited

U.S. PATENT DOCUMENTS

| | | | |
|---|---|---|---|
| 3,512,113 | 5/1970 | Kirkendall | 200/303 X |
| 3,523,269 | 8/1970 | Witek, Jr. et al. | 339/91 R |
| 3,651,446 | 3/1972 | Sadogierski et al. | 339/91 R |
| 4,034,265 | 7/1977 | Durocher et al. | 361/24 X |
| 4,042,860 | 8/1977 | Woods et al. | 361/25 |
| 4,084,202 | 4/1978 | Stoll | 361/29 X |
| 4,092,573 | 5/1978 | D'entremont | 361/26 X |
| 4,168,877 | 9/1979 | Little et al. | 339/91 R X |

FOREIGN PATENT DOCUMENTS 1042126 9/1966 United Kingdom .

*Primary Examiner*—Reinhard J. Eisenzopf
*Attorney, Agent, or Firm*—Joseph E. Papin

[57] ABSTRACT

A combination starter-protector device adapted for removable mounting in electrical contacting engagement onto at least a pair of male terminals of a dielectric plug device secured to an apparatus housing. The combination starter-protector device has a casing, a PTCR disposed therein, and a switch in the casing for association in thermal coupling relation with the PTCR. A spring associated with the casing is adapted for releasable securing engagement with the apparatus housing so as to maintain the combination starter-protector device against displacement from the electrical contacting engagement thereof with the at least male terminal pair of the dielectric plug device when the combination starter-protector device is removably mounted thereto.

27 Claims, 10 Drawing Figures

COMBINATION STARTER-PROTECTOR DEVICE, APPARATUS UTILIZING SUCH DEVICE, AND METHODS OF ASSEMBLING

FIELD OF THE INVENTION

This invention relates generally to electrical devices and in particular to a combination starter-protector device, apparatus utilizing such device, and methods of assembling.

BACKGROUND OF THE INVENTION

In the past, various different types of combination starter-protector devices have been utilized in circuit relation with a winding circuit of a dynamoelectric machine. At least some of these past combination starter-protector devices utilized a positive temperature coefficient resistor (PTCR) which was operable generally to at least impede current flow to a start or auxiliary winding means of the dynamoelectric machine winding circuit generally as the dynamoelectric machine was energized to its preselected running or synchronous speed, and an overload or protector was thermally coupled with the PTCR and subjected to the current in at least a run or main winding means of the dynamoelectric machine. Of course, the overload was operable to interrupt the current flow to the dynamoelectric machine in the event of the occurrence of a winding circuit overload condition which may have a deleterious effect on components of the dynamoelectric machine, such as for instance burning-out of the winding circuit. U.S. Pat. No. 4,131,871 issued Dec. 26, 1978 to Donald L. Haag and Lee O. Woods, U.S. Pat. No. 4,084,202 issued Apr. 11, 1978 to Donald H. Stoll, U.S. Pat. No. 4,042,860 issued Aug. 16, 1977 to Lee O. Woods and James P. Frank, and U.S. Pat. No. 4,037,316 issued July 26, 1977 to Donald H. Stoll illustrate some of the above-discussed combination starter-protector devices, as well as the operation thereof, in circuit with a dynamoelectric machine winding circuit, and each of these aforementioned patents is incorporated by reference herein.

The past combination starter-protector devices were associated in various manners with various types of dynamoelectric machines and other apparatus, such as for instance air conditioners or refrigerators having compressors or the like which utilized hermetic electric motors. In many of these compressor units, a Fusite plug or the like was mounted through a housing or jacket thereof, and such plug contained a plurality of male terminals connected internally of the compressor jacket with the winding circuit of the hermetic motor. At least some of the past combination starter-protector devices, such as for instance those illustrated in the aforementioned patents, were associated in electrical mounting engagement with the male terminals of the Fusite plug exteriorly of the compressor jacket. Of course, some of the past starter devices were of both the plug-on and plug-in type, as illustrated in U.S. Pat. Nos. 3,921,117 and 3,955,170, respectively. In some other installations, at least the starter device was electrically interconnected by a plurality of leads having quick-connect terminals which were associated with dynamoelectric machine terminals so as to be "hung" therefrom. At least one of the disadvantageous or undesirable features with respect to the above discussed mounting of the past combination starter-protector device is believed to be that such past combination starter-protector devices may have been subject to accidental displacement or other disassociation from its Fusite plug during the assembly process of the apparatus, during its assembly into a refrigerator or room air conditioner or the like for instance, or even after such apparatus was assembled into such refrigerator or room air conditioner.

Of course, at least others of the past apparatus had a housing or a jacket to which a metal guard (sometimes referred to as a "fence") was attached by suitable means, such as welding for instance, so as to surround the Fusite plug in spaced relation therewith, and the marginal or free end edge of such metal guard or fence defined an access opening thereinto so as to permit the assembly through such access opening of a combination starter-protector device into its mounted relation with the Fusite plug, as previously discussed. With the combination starter-protector device so assembled or otherwise mounted onto the Fusite plug, a closure or cover member was suitably positioned or otherwise located across the free end edge of the fence in engagement therewith so as to close the access opening into the fence, and suitable means, such as a bail or the like for instance, was associated or otherwise interconnected between the cover and the fence or housing for removably securing the cover to the fence. Upon this assembly of the cover to the fence, at least some protection was provided against the aforementioned accidental displacement of the past combination starter-protector devices from their aforementioned mounted positions onto the Fusite plugs. Of course, other electrical devices, such as a current relay or the like for instance, were mounted in the above discussed plug-on relation with Fusite plugs protected by the above discussed fence and cover generally in the same manner as discussed above with respect to the past combination starter-protector devices. However, at least one of the disadvantageous features with respect to apparatus utilizing the above discussed fence and removably secured cover therefor to protect electrical devices mounted therewithin to Fusite plugs is believed to be that such cover and means for removably securing it to the fence not only added material cost to the apparatus but also increased the assembly line costs thereof.

In some other apparatus having a fence secured to a housing or jacket thereof so as to surround a Fusite plug in such housing, a closure member or cover for the access opening in the fence was secured or otherwise attached to an electrical device, such as a current relay or the like for instance, adapted to be mounted or otherwise plugged onto the Fusite plug. Upon the assembly through the access opening in the fence of this current relay into the mounted position thereof onto the Fusite plug, the cover attached to such current relay was sized to at least generally mate with the free end edge of the fence so as to close the access opening therein. At least in some instances, the cover attached to the current relay included a plurality of fingers or the like for instance which were movable into gripping engagement with the fence adjacent its free end edge generally in "paper-clip" engaging fashion when the current relay was inserted into its mounted position onto the Fusite plug. However, at least one of the disadvantageous or undesirable features with respect to apparatus utilizing the above discussed electrical device with a cover attached thereto is believed to be that such electrical device and its attached cover could be accidentally displaced or otherwise disassociated from the Fusite plug and the fence during the assembly process of the apparatus, during its assembly into a refrigerator or room air conditioner or the like, or even after such apparatus was assembled into such refrigerator or room air conditioner for instance.

SUMMARY OF THE INVENTION

Among the several objects of the present invention may be noted the provision of an improved combination starter-protector device, an improved apparatus and an improved method of assembling a combination starter-protector device which overcome at least some of the disadvantageous or undesirable features discussed hereinbefore, the provision of such improved combination starter-protector device and improved method in which a plurality of separable casing members of such combination starter-protector device are releasably secured in an assembly position in interlocking engagement against separation; the provision of such improved starter-protector device and improved method in which the interlocking engagement of such casing members may be interrupted from exteriorly thereof to effect the separation of such casing members from the assembly position thereof; and the provision of such improved combination starter-protector device and improved method in which the components thereof are simplistic in design, economically manufactured and easily assembled. These as well as other objects and advantageous features of the present invention will be in part apparent and in part pointed out hereinafter.

In general, a combination starter-protector device in one form of the invention is adapted for connection in circuit relation with a winding circuit of a dynamoelectric machine. The combination starter-protector device has a casing including a plurality of separable casing members arranged in a preselected assembly position with respect to each other, annd a PTCR and a bimetal switch element are arranged in thermal coupling relation with each other within the casing members. Means for releasably securing the casing members against separation from the preselected assembly position thereof includes guide means respectively associated with a pair of the casing members for effecting separation therebetween generally only in opposite directions and means respectively associated with a third one of the casing members and at least one of the casing members of the pair thereof for interlocking in engagement therebetween when the casing members are in the preselected assembly position thereof. The third one casing member is arranged at least in part, in overlaying relation with the casing member pair so as to obviate separation thereof in the opposite direction when the interlocking means is engaged with the at least one casing member.

Also in general and in one form of the invention, a combination starter-protector device adapted for connection in circuit relation with a winding circuit of a dynamoelectric machine has a casing with a plurality of wall means defining therein a chamber. A PTCR and a bimetal switch element are arranged in thermal coupling relation with each other within the chamber, and a pair of recesses are provided in at least one of the wall means so as to intersect with the chamber. A pair of male terminals are disposed within the chamber with at least one of the male terminals connected in circuit relation with the bimetal switch element, and the male terminals include a pair of means extending into the recesses in releasable engagement therewith for predeterminately locating the male terminals with respect to each other in the chamber. Passage means in another of the wall means intersecting with the chamber is adapted for receiving from exteriorly of the casing a means for releasable electrical connection with the male terminals, respectively.

Still further and in one form of the invention, a combination starter-protector device adapted for connection in circuit relation with a winding circuit of a dynamoelectric machine has a casing including a plurality of separable casing members releasably secured together in interlocking engagement, and a PTCR and a bimetal switch element are arranged in thermal coupling relation with each other in the casing. A pair of means interiorly of said casing on a pair of said casing members are releasably associated with each other for maintaining said casing members against separation from the interlocking engagement thereof, and passage means in one of said casing members is arranged with respect to the maintaining means for receiving a tool adapted to engage at least one of the maintaining means and interrupt the association thereof with the other of the maintaining means.

Still further in general, a method in one form of the invention is provided for assembling a combination starter-protector device having a PTCR, a bimetal switch element, and a casing therefor comprising a plurality of separable casing members. In this method, both the PTCR and the bimetal switch element are arranged in thermal coupling relation with respect to at least one of the casing members of the plurality thereof. At least another of the casing members of the plurality thereof is associated at least in part in overlaying relation with respect to the at least one casing member, and a pair of means disposed on the at least one casing member and the at least another casing member for interlocking in engagement with each other are releasably secured so as to maintain the at least one casing member and the at least another casing member in a preselected assembly position against separation.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the disclosure or the scope of the claims which follow.

DETAILED DESCRIPTION OF THE PREFERRED EMBODIMENTS

Figure 1:
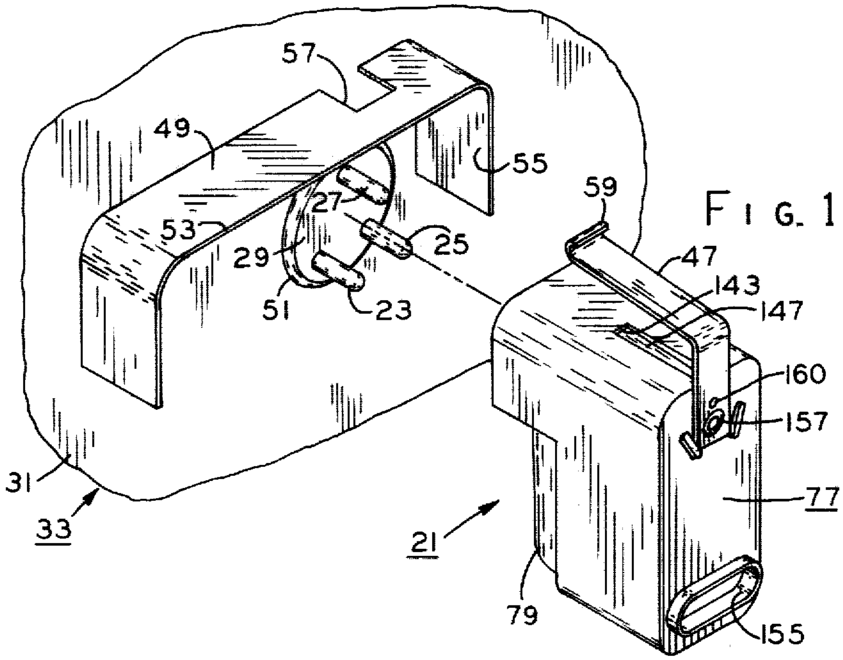
FIG. 1 is a partial exploded perspective view illustrating an apparatus utilizing a combination starter-protector device releasably secured to a housing of the apparatus and removably mounted in electrical engagement onto a pair of male terminals of a dielectric plug device secured to the housing and also illustrating principles which may be practiced in a method of assembling the combination starter-protector device with the apparatus.
Figure 2:
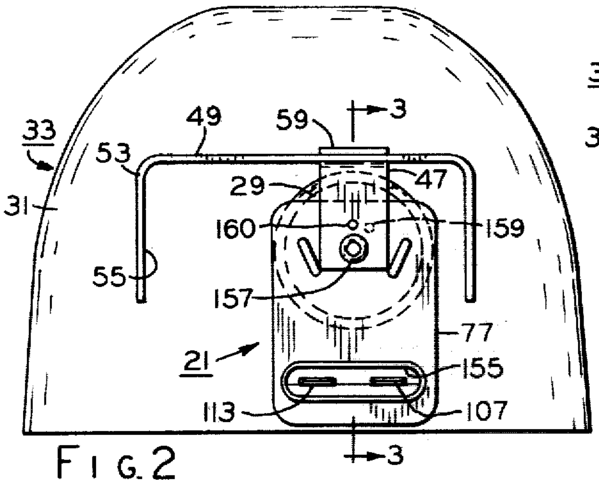
FIG. 2 is a partial front elevational view of the combination starter-protector device mounted to the apparatus of FIG. 1.
Figure 3:
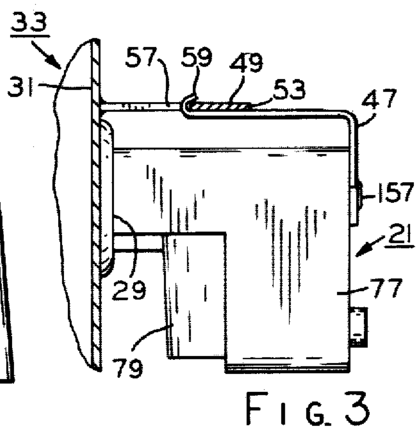
FIG. 3 is a partial sectional view taken from FIG. 2.
Figure 4:
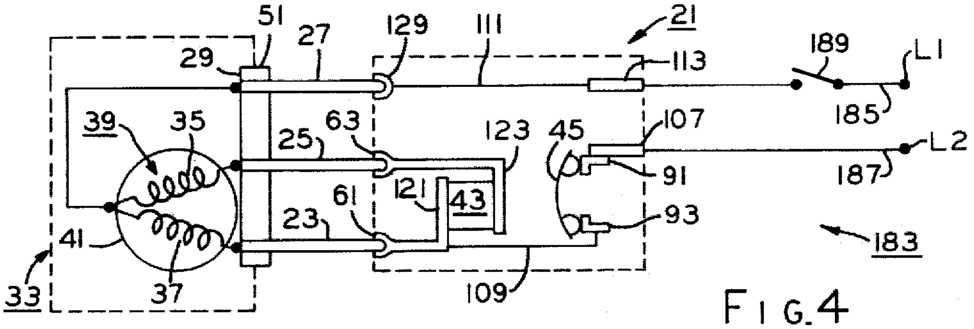
FIG. 4 is a schematic diagram of an exemplary circuit illustrating the electrical connections of the male terminals of the apparatus in circuit relation with a winding circuit of a dynamoelectric machine arranged within the apparatus housing and also the electrical connections of the male terminals with the components of the combination starter-protector device mounted thereto.
Figure 5:
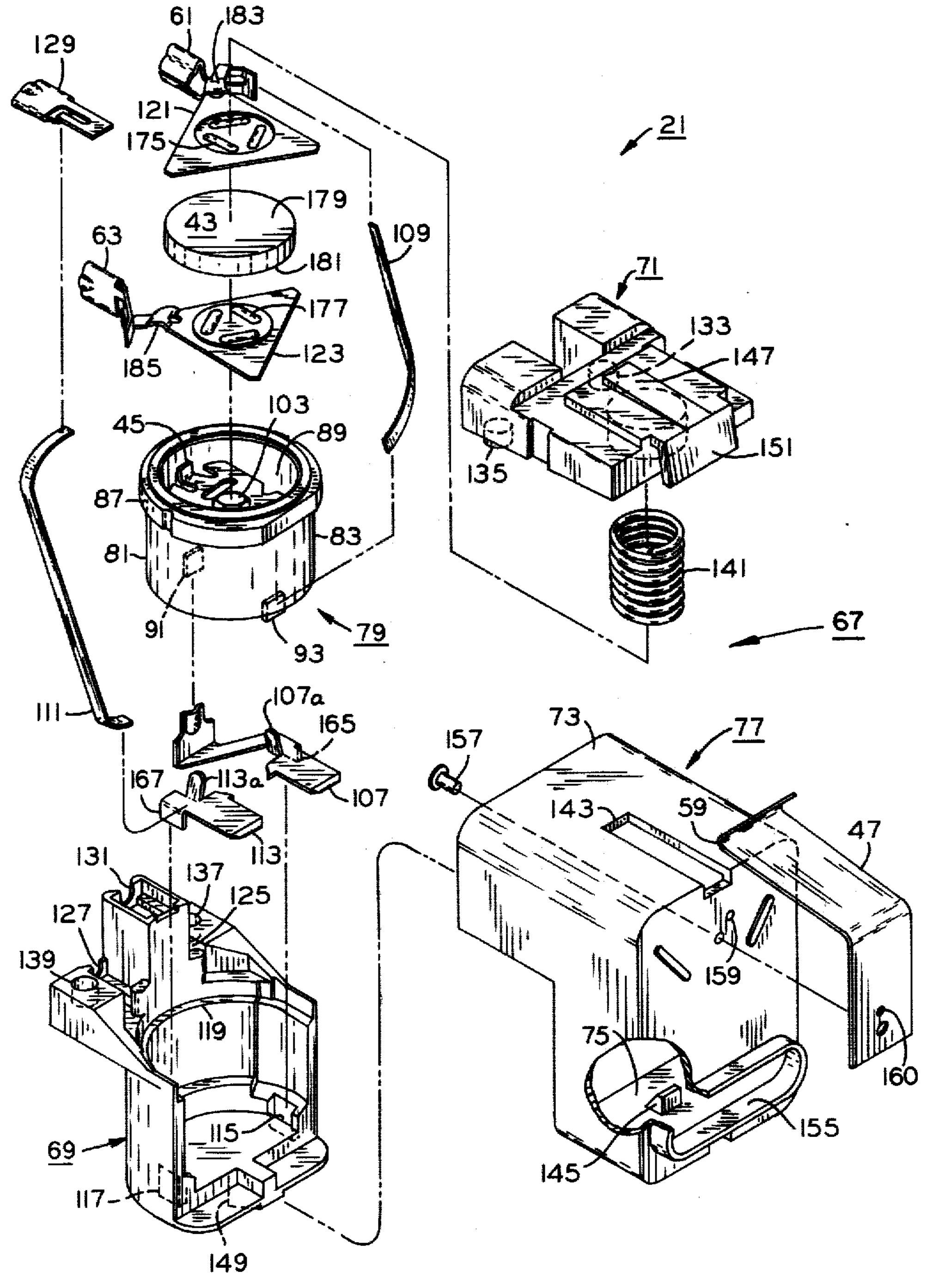
FIG. 5 is an exploded perspective view showing the combination starter-protector device in one form of the invention and illustrating principles which may be practiced in a method of assembling the combination starter-protector device also in one form of the invention.

Referring now to the drawings in general, there is illustrated a method of assembling a combination starter-protector device 21 into a preselected assembly position removably mounted in electrical engagement onto a plurality of male mounting terminals or terminal means 23, 25, 27 of a dielectric plug device 29, such as a Fusite plug or the like for instance, secured or otherwise mounted to a housing or jacket 31 of an apparatus indicated generally at 33, such as a hermetic compressor or the like for instance which may be of the type utilized in refrigeration or air conditioning equipment (FIGS. 1-3). A pair of male terminals 23, 25 of dielectric plug device 29 are connected in circuit relation with an auxiliary winding means or start winding 35 and a main winding means or run winding 37 of a winding circuit 39 for a dynamoelectric machine 41 arranged within housing 31 so as to drive apparatus 33 (FIG. 4). Combination starter-protector device 21 has a positive temperature coefficient resistor (PTCR) 43 and a bimetal switch element 45 arranged therein in thermal coupling relation (FIG. 5). In this method, combination starter-protector device 21 is moved toward its preselected assembly position removably mounted in electrical engagement onto at least male terminals 23, 25 of dielectric plug device 29, and thereby PTCR 43 and bimetal switch element 45 are connected or otherwise placed in circuit relation with start winding 35 and run winding 37 of dynamoelectric machine winding circuit 39, respectively (FIGS. 1-4). A resilient means, such as a leaf-type spring 47 or the like for instance, is engaged or otherwise associated with a part, such as a guard or fence 49 for instance, of apparatus housing 31 for releasably securing the combination starter-protector device in the preselected assembly position thereof, and thereby the combination starter-protector device is maintained or otherwise releasably retained against displacement or separation from its electrical engagement with male terminals 23, 25 of dielectric plug device 29 (FIGS. 2 and 3).

Figure 7:
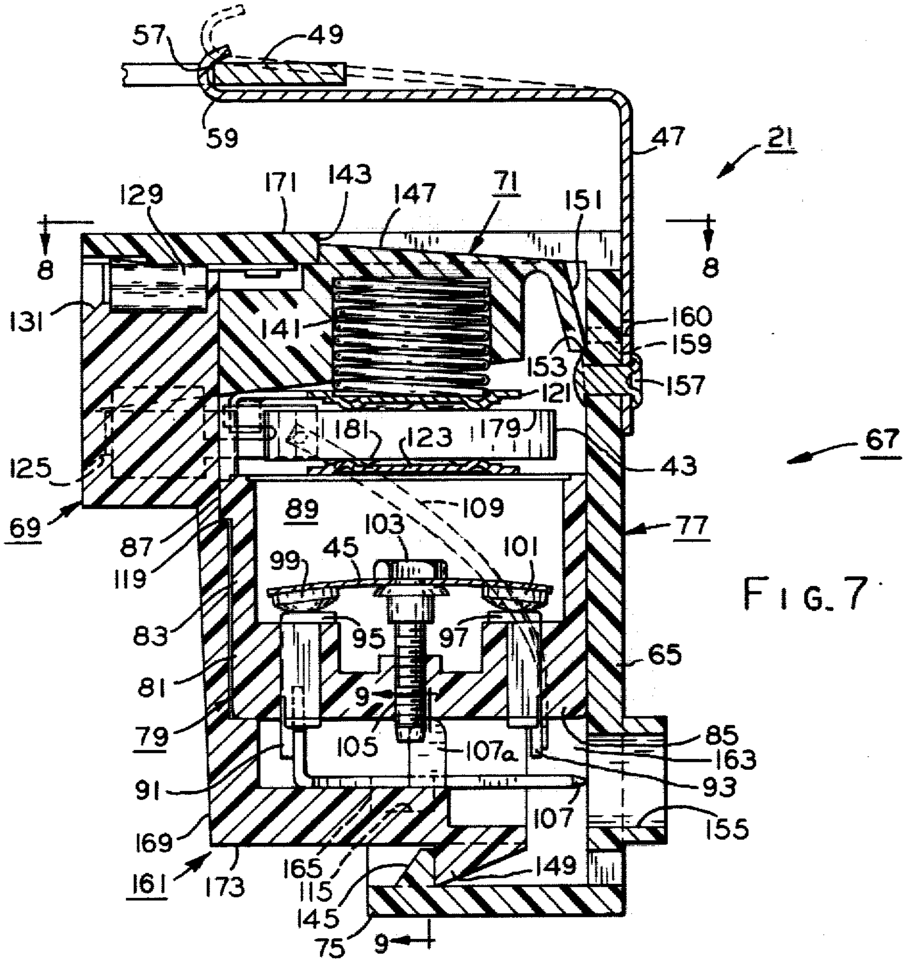
FIG. 7 is a sectional view taken along line 7—7 of FIG. 6.

More particularly and with specific reference to FIGS. 1-3, fence 49 comprises a metallic protective enclosure attached by suitable means, such as welding or the like for instance, to apparatus housing 31 so as to extend adjacent and at least in part generally about dielectric plug device 29 which is fixedly received or otherwise secured by suitable means (not shown) in an aperture 51 provided through the apparatus housing. A free end edge or marginal portion 53 of fence 49 defines at least in part a passage means or access opening 55 for the passage therethrough or therepast of at least a part of combination starter-protector device 21, and means, such as another opening 57 or the like for instance, is provided in the fence for releasably receiving or otherwise securing in engagement a detent, such as a finger or hook 59 for instance, integrally defining a free end or free end portion of spring 47. Thus, in the assembly of combination starter-protector device 21 with apparatus 33, an assembly operator or repair workman aligns at least a pair of female terminal or terminal means 61, 63 contained in the combination starter-protector device (see FIG. 5) with at least male terminals 23, 25 of plug device 29, as best seen in FIG. 1, and thereafter moves the combination starter-protector device at least in part through or past access opening 55 of fence 49 toward its preselected assembly position with the female terminals removably mounted in electrical engagement onto the male terminals, as best seen in FIGS. 2-4. As combination starter-protector device 21 is being moved toward its preselected assembly position, as discussed above, the operator may apply a force on spring 47 to deform or otherwise stress it from the at-rest position thereof toward a displaced position, as best seen in FIG. 7, so as to effect the passage of the spring past free end edge 53 of fence 49 into access opening 55 thereof. Of course, during the operator movement of combination starter-protector device 21 toward its preselected assembly position, spring 47 thereof is generally aligned with opening 57 in fence 49; and, at least when the preselected assembly position of the combination starter-protector device is attained, the operator may release the applied force on the spring, and the compressive force of the spring effects its return movement from the displaced position toward the at-rest position thereof so as to releasably secure or otherwise interlock detent 59 of the spring with opening 57 of the fence, as best seen in FIGS. 3 and 7. With combination starter-protector device 21 so removably mounted in the preselected assembly position thereof onto male terminals 23, 25 of plug device 29 so as to extend at least in part into access opening 55 within the protective confines of fence 49 and with spring 47 of the combination starter-protector device so engaged with opening 57 in the fence, it is believed that the combination starter-protector device may not be easily or readily accidentally displaced from its preselected assembly position either by other assembly operators during the assembly of apparatus 33, during the assembly of the apparatus into refrigeration or air conditioning equipment with which the apparatus may be associated, or by other servicemen who may service or repair the apparatus in the field. To the contrary, in order to remove or displace combination starter-protector device 21 from its preselected assembly position, it is necessary to reapply a force onto spring 47 urging it toward its displaced position so as to disengage spring detent 59 from opening 57 in fence 49, and at the same time, also apply a disassembly force so as to disengage or otherwise remove female terminals 61, 63 of the combination starter-protector device from male terminals 23, 25 of plug device 29 in order to displace or otherwise remove the combination starter-protector device through access opening 55 in the fence.

Referring again in general to the drawings and recapitulating at least in part with respect to the foregoing, there is illustrated that combination starter-protector device 21 has a casing or casing means 65 adapted for removable mounting in electrical engagement onto at least male terminals 23, 25 of plug device 29 secured to apparatus housing 31 having dynamoelectric machine 41 arranged therein and with the male terminals connected in circuit relation with winding circuit 39 of the dynamoelectric machine (FIGS. 1-4). PTCR 43 and bimetal switch element 45 are disposed in thermal coupling relation in casing 65, and resilient means or spring 47 mounted to the casing exteriorly thereof is adapted for releasable securing engagement with fence 49 generally adjacent plug device 29 so as to maintain combination starter-protector device 21 against displacement from the electrical engagement thereof with male terminals 23, 25 of the plug device when the combination starter-protector device is removably mounted thereon (FIGS. 2-4).

Figure 6:
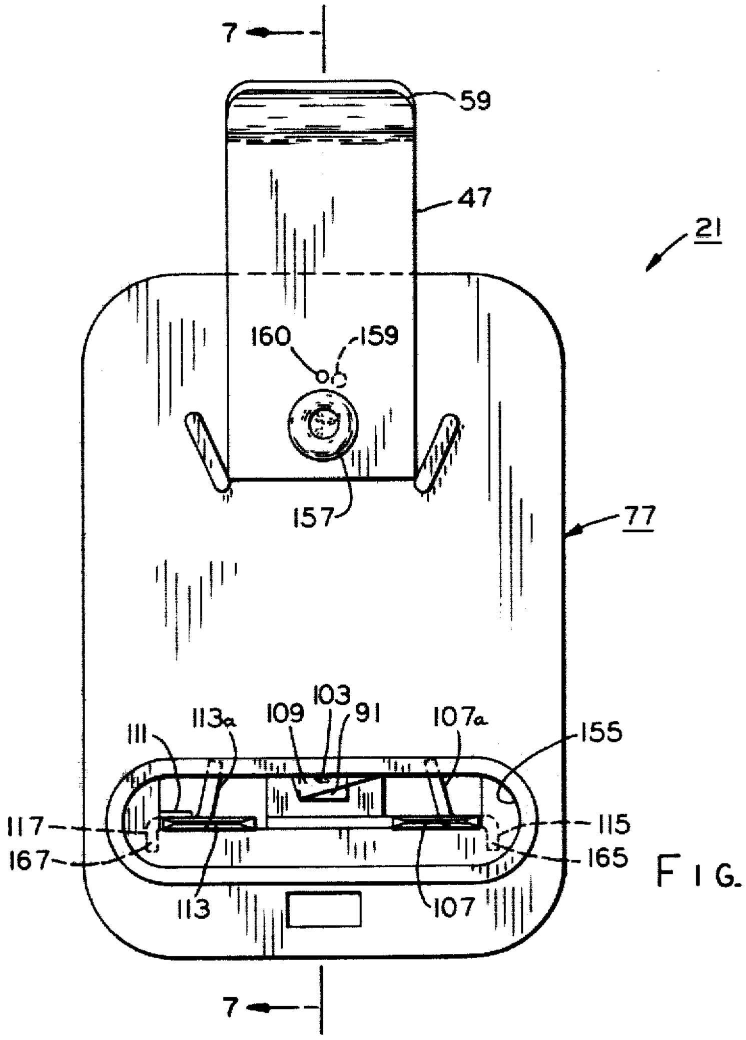
FIG. 6 is a right side elevational view of the combination starter-protector device of FIG. 5.

There is also illustrated in one form of the invention a method of assembling combination starter-protector device 21 having PTCR 43, bimetal switch element 45, and casing 65 therefor comprising a plurality of separable casing members, indicated generally at 67 (FIGS. 5-7). In this method, both PTCR 43 and bimetal switch element 45 are arranged or otherwise located or disposed in thermal coupling relation with each other in at least one of the casing members 69 of casing member plurality 67, and another of the casing members 71 of the casing member plurality is associated or otherwise engaged or interconnected with the one casing member so that the one casing member and the another casing member are separable generally only in opposite directions (FIGS. 5 and 7). Respective parts, such as a pair of opposite flanges or flange means 73, 75 for instance, of a third one of the casing members 77 of casing member plurality 67 are overlaid or otherwise overlapped with each of the one and another casing members 69, 71 so as to obviate separation thereof in the opposite directions, and the third one casing member is interlocked or otherwise releasably secured with at least one of the one and another casing members (FIGS. 5 and 7).

More particularly and with specific reference to FIGS. 5 and 7, a protector device or overload 79 is provided with a generally cylindric housing or housing means 81, molded or otherwise formed of a suitable dielectric material, such as a resin or the like for instance, and has a generally annular or cylindric sidewall 83. A base or closure wall 85 is integrally formed with sidewall 83 at the lower end thereof while a generally radially extending flange or rim 87 is integrally formed with the sidewall at least adjacent the upper end thereof. Thus, sidewall 83 and base wall 85 define an open-ended chamber 89 within housing 81 in which bimetal switch element 45 is located. As best seen in FIG. 7, a pair of terminals 91, 93 extend through base wall 85 of housing 81 being integrally molded therewith or otherwise retained in the base wall by suitable means, and the interior end portions of the terminals respectively define a pair of contacts or contact means 95, 97 adapted for making and breaking with bimetal switch element 45. Contacts 95, 97 are arranged within housing 81 generally adjacent base wall 85 while the exterior ends or end portions of terminals 81, 83 define electrical connector sections thereof. Bimetal switch element 45 carries another pair of contact or contact means 99, 101 for making and breaking with contacts 95, 97 of terminals 91, 93, respectively. As shown, when bimetal element 45 is in an at-rest or circuit completing position thereof, contacts 99, 101 of the bimetal switch element are disposed in circuit making engagement with contacts 95, 97 of terminals 93, 95. Bimetal switch element 45 is generally centrally mounted to or carried on an adjusting screw 103 which is adjustably or threadedly received in a threaded aperture or opening 105 in base wall 85 of housing 81 to adjust the bias on bimetal switch element 45 urging its movable contacts 99, 101 into making engagement with stationary contacts 95, 97 of terminals 91, 93, respectively. Thus, it may be noted that at least bimetal switch element 45 comprises a switch means or device adapted for operation between circuit making and breaking positions so as to be current carrying when connected in circuit relation with winding circuit 39 of dynamoelectric machine 41, as discussed hereinafter, and such switch means is also thermal responsive. While protector device 79 is presented herein for purposes of disclosure, it is contemplated that other types of protector devices having various other configurations may be utilized within the scope of the present invention so as to meet the objects and advantageous features thereof. Protector device 79 is a model 3ARG1 overload available from the General Electric Company, Morrison, Ill.

Figure 9:
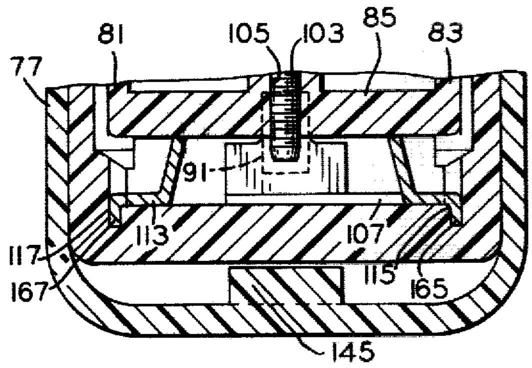
FIGS. 8 and 9 are partial sectional views taken along line 8—8 and line 9—9 of FIG. 7 and with some casing parts removed to illustrate with clarity components of the combination starter-protector device, respectively.
Figure 8:
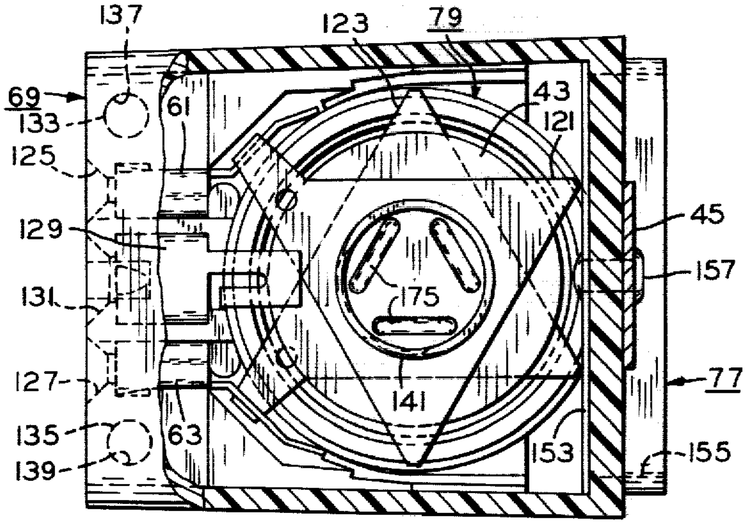

In the assembly of combination starter-protector device 21, a male terminal 107 and one end of a conductor strap or lead 109 are respectively electrically connected by suitable means, such as welding, soldering, crimping or the like for instance, with an exterior end or electrical connector section of protector terminal 93, and one end of another conductor strap or lead 111 is also electrically connected by the aforementioned suitable means with another male terminal 113; however, the connections of male terminal 107 and strap 111 with protector terminal 93 may be either prior to, after, or simultaneous with the connection of strap 111 with male terminal 113. Thereafter, male terminals 107, 113 may be seated or otherwise predeterminately located in a pair of recesses 115, 117, predeterminately located or provided therefor on casing member 69 with rim 87 of protector housing 81 seated or otherwise supported or located on a confronting ledge or groove means 119 provided therefor on casing member 69, as best seen in FIGS. 6, 7 and 9. With protector 79, male terminals 107, 113 and straps 109, 111 so arranged in casing member 69, PTCR 45 interposed between a pair of contact plates 121, 123 may be placed with respect to the casing member so that contact plate 123 is abutted or otherwise seated on the upper end of protector housing 81, as best seen in FIGS. 5, 7 and 8. Female terminals 61, 63 which are illustrated as integrally formed with contact plate 121, 123 are arranged or otherwise seated or located in a pair of apertures 125, 127 provided therefor in casing member 69, and another female terminal 129 may also be arranged or otherwise seated or located in another aperture 131 provided therefor in the casing member. At this time, the opposite ends of straps 109, 111 may be electrically connected by suitable means, such as welding, soldering, crimping or the like for instance, with female terminals 61, 129; however, the connection of the straps and female terminals may also occur either prior to or simultaneous with the connections of the straps with protector terminal 93 and male terminal 113, as previously mentioned, and also prior to the disposition of the terminals in the apertures therefor in the casing member. It may be noted that when contact plate 123 seats PTCR 43 atop housing 81 of protector 79, the PTCR and bimetal switch element 45 are arranged or otherwise associated in thermal coupling relation.

At this time, casing member or cover lock 71 is associated or otherwise arranged or located in a preselected assembly position at least in part in overlaying or overlapping relation with respect to casing member 69 so that a pair of extension means, such as bosses 133, 135 or the like for instance, integral with casing member 71 are received or otherwise located in a pair of recesses 137, 139 provided therefor in casing member 69, and resilient means, such as a spring 141 or the like for instance is interposed between cover member 71 for urging contact plates 121, 123 into electrical contacting engagement with PTCR 43 and seating contact plate 123 atop protector housing 81, as best seen in FIGS. 5 and 7. Further, when casing members 69, 71 are so associated with each other, female terminals 61, 63 are captured in apertures 125, 127 of casing member 69, as best seen in FIGS. 6 and 9. Thus, with casing members 69, 71 in the preselected assembly position thereof, it may be noted that the casing members are separable or movable with respect to each other generally only in opposite directions due to the seating or guiding engagement of bosses 133, 135 on casing member 71 received in recess 137, 139 in casing member 69.

Subsequent to the above discussed disposition of casing members 69, 71 in the preselected assembly position thereof, flanges 73, 75 of casing member or cover 77 are moved or otherwise placed in overlaying or overlapping arrangement with confronting parts of casing members 69, 71, respectively, and when so arranged in the overlaying relation, it may be noted flanges 73, 75 of casing member 77 obviate the separation of casing members 69, 71 in the aforementioned opposite directions with respect to each other, as best seen in FIGS. 5 and 7. Thereafter, in response to an assembly or operator applied force exerted on at least one of casing members 69, 71, 77, the casing members are moved or otherwise urged or displaced toward the preselected assembly position thereof so as to releasably interlock or otherwise releasably secure them together against separation or displacement. The interlocking of casing members 69, 71, 77 is effected in response to the aforementioned applied force movement of the casing members wherein a pair of interlocking means, such as detents or latches 143, 145 or the like for instance, on flanges 73, 75 of casing member 77 are moved into releasable or interlocking engagement with another pair of interlocking means, such as detents or latches 147, 149 or the like for instance, respectively provided on casing members 71, 69. Of course, flange 73 of casing member 77 overlays or overlaps aperture 131 in casing member 69 so as to capture therein female terminal 129 when the casing members are in the preselected assembly position thereof.

While casing members 69, 71, 77 are being moved toward the preselected assembly position so as to effect the engagements of interlocking means or detents 143, 147 and 145, 149, the engagement between flange 73 of casing member 77 and detent 147 of casing member 71 causes a slight deformation or stresssing of casing member 71 thereby to permit the passage of a pair of wedge means or wedging engagement means, such as a depending finger or flange 151 on casing member and a ledge or flange 153 on casing member 77 or the like for instance, into adjacent overlaying or overlapping relation with each other, and of course, when detents 143, 147 and 145, 149 snap or interlock into releasable securing engagement, as discussed above, casing member 77 relaxes or resiles, and the wedge means or finger 151 and ledge 153 are thereby urged into wedging or gripping engagement with each other so as to also releasably secure casing members 69, 71, 77 in the preselected assembly position thereof. It may also be noted that upon the movement of casing members 69, 71, 77 into their preselected assembly position, casing member 77 is provided with means, such as an access opening 155 or the like for instance, for the passage therethrough of a quick connect fitting assembly (not shown) into electrical contacting engagement with male terminals 107, 113 which are predeterminately arranged so as to align with access opening or passage means 155. To complete the description of the method of assembling combination starter-protector device 21, it is apparent that leaf spring 47 may, if desired, be secured by suitable means, such as a rivet 157 or the like for instance, to casing member 77 any time prior to the assembly thereof with casing members 69, 71, and albeit not shown, it is also contemplated that the head of rivet 157 may replace the above discussed ledge 153 of casing member 77 as a wedge means for the like for instance for the wedging engagement with finger 151 during the assembly of casing means 69, 71, 77 into the preselected assembly position thereof, as discussed hereinabove.

With respect to the disassembly of combination starter-protector device 21, casing member 77 is provided with means, such as a tool receiving opening 159, for the passage therethrough of a tool (not shown) into driving engagement with finger 151 of casing member 71 so as to drive or otherwise displace it from its wedging engagement with ledge 153 on casing member 77. Of course, spring 47 acts as a dust cover or the like being disposed in overlaying relation with tool opening 159; however, the spring may be manually pivoted about its rivet 157 so as to align another opening 160 in the spring with the tool opening when it is desired to insert the aforementioned tool therethrough. When finger 151 is so displaced from ledge 153, an operator or applied force may be exerted on casing member 77 so as to rock or otherwise move it with respect to casing members 69, 71, and in response to such rocking movement of casing member 77, detects 143, 145 thereof may be released or otherwise disengaged from detents 147, 149 of casing members 71, 69. Of course upon the disengagement of detents 143, 145 from detents 147, 149, as discussed above, casing member 77 may be separated from casing members 69, 71 which may also then be separated.

With reference again in general to the drawings and recapitulating at least in part with respect to the foregoing, combination starter-protector device 21 in one form of the invention is provided with casing 65 having a plurality of wall means, indicated generally at 161 defining a chamber 163 therein (FIGS. 5 and 7). PTCR 43 and bimetal switch element 45 are arranged in thermal coupling relation within chamber 163, and recesses or recess means 115, 117 are provided at least in part in one of the wall means of the plurality 161 thereof (FIGS. 5, 6 and 9). Male terminals 107, 113 are disposed within chamber 163 with at least male terminal 107 being connected in circuit relation with bimetal switch element 45, and the male terminals include a pair of means, such as tabs 165, 167 or the like for instance, extending into recesses 115, 117 into releasable engagement therewith for predeterminately locating or otherwise positioning in a restraining manner the male terminals within the recesses and with respect to each other in the chamber (FIGS. 5 and 9). Passage means or access opening 155 is provided in another of the wall means of the plurality 161 thereof intersecting with chamber 163 so as to generally align with male terminals 107, 113, and access opening 155 is adapted for receiving from exteriorly of casing 61 a means, such as quick connect assembly (not shown), for releasable electrical connection with male terminals 107, 113 (FIG. 9).

More particularly and with specific reference to FIGS. 5-9, casing members 69, 71, 77 of combination starter-protector device 21 abut together in the preselected assembly position thereof so as to generally define the wall or wall means plurality 161 of casing 65 which generally include a sidewall 169 interposed between a pair of opposite end walls 171, 173. As illustrated herein for purposes of disclosure, terminal locating recesses 115, 117 intersect with both sidewall 169 and lower end wall 173 of casing 65 so as to be predeterminately located therein; however, it is contemplated that such recesses may be provided only in either of the sidewall and lower end wall within the scope of the invention so as to meet the objects thereof. Thus, when tabs 165, 167 of male terminals 107, 113 are releasably engaged or otherwise inserted into locating engagement with recesses 115, 117, male terminals 107, 113 are predeterminately located within casing chamber 163 so as to be aligned with access opening 155 which extends through sidewall 169 of casing 65. Male terminals 107, 113 also include a pair of generally upstanding means, such as integrally formed ears or abutments or the like for instance, for locating or supporting engagement with base wall 85 of protector housing 81 thereby to provide added support so as to locate protector 79 within casing chamber 163 when rim 87 of the protector is located in engagement with groove 119 provided on casing sidewall 169 within the casing chamber. Of course, straps 109, 111 which are connected between male terminals 107, 113 and contact plates 121, 123 extend through casing chamber 163 at least in part between casing sidewall 169 and housing sidewall 83 of protector 79.

Contact plates 121, 123 are also illustrated herein for purposes of disclosure as having generally flat triangular shapes with peripheral or side edges extending at least adjacent casing sidewall 169 so as to abut or locate therewith, and a plurality of means, such as dimples 175, 177 or other indentation configurations or the like for instance, are provided in the contact plates for electrical contacting engagement with a pair of opposite contact sides 179, 181 of PTCR 43 which, as previously mentioned, is embraced by the contact plates within casing chamber 163. Of course, it is contemplated that other contact plates having various other configurations as well as various other electrical contacting indentation configurations may be utilized within the scope of the invention so as to meet the objects thereof. Further, it may be noted that contact plates 123, 125 and female terminals 61, 63 are integrally interconnected by a pair of generally thin or narrow deformable sections or joints 183, 185 which may be flexed or otherwise stressed so as to accommodate various thicknesses which may be encountered in PTCR 43; however, it is contemplated that contact plates 121, 123 and female terminals 61, 63 may be separately formed and interconnected by suitable means, such as welding, soldering, crimping or the like for instance within the scope of the invention so as to meet the objects thereof.

When combination starter-protector device 21 is connected in circuit relation with winding circuit 39 of dynamoelectric machine 41, as discussed in greater detail hereinafter and as best seen in FIG. 4, PTCR 43 is operable generally in response to current flow therethrough to increase its resistance generally as a function of its temperature, as illustrated graphically and by way of example in FIG. 10, and when so energized, the PTCR generates or emits heat. Since PTCR 43 and bimetal switch element 45 are associated in thermal coupling relation, as previously discussed, any heat emitted from the PTCR may pass through chambers 163 and 89 respectively in casing 65 and protector housing 81 toward the bimetal switch element therein. Of course, opposite contact sides 179, 181 of PTCR 43 are coated or otherwise layered or covered with a suitable electrode, such as a chemical composition, a metal or alloy thereof, a glass or glass-like material, or a combination thereof for instance (not shown), so as to insure the generally even or constant flow or distribution of current through the PTCR between the opposite contact sides thereof. While PTCR 43 is shown herein as having a generally cylindric shape, it is contemplated that a PTCR having a shape other than generally cylindric may be employed within the scope of the invention so as to meet the objects thereof.

In the exemplary schematic diagram of a circuit 183 in FIG. 4, start winding 35 and run winding 37 of dynamoelectric machine winding circuit 39 are shown connected in circuit relation, and plug device 29 is illustrated in mounted association with housing or jacket 31 of apparatus 33; however, it is contemplated that the plug device may be mounted with a structural component of a dynamoelectric machine within the scope of the invention so as to meet the objects thereof. Male mounting terminals 23, 25 are respectively connected in circuit relation with start and run windings 35, 37 of dynamoelectric machine 41, and male terminal 27 is connected in circuit relation with both the start and run windings. Female terminals 61, 63, 129 of combination starter-protector device 21 are disposed to releasably receive male mounting terminals 23, 25, 27 in electrical conductive plug-on or contacting relation when the combination starter-protector device is associated in circuit relation with dynamoelectric machine 41, and a pair of leads 185, 187 are respectively connected between a pair of power terminals L1, L2 and male terminals 107, 113 of combination starter-protector device 21, respectively. To complete the description of circuit 183, a dynamoelectric machine or motor control, such as an on-off switch 189 or the like for instance, may be interposed in lead 185.

In the operation of combination starter-protector device 21 when assembled in its preselected assembly position onto plug 29, an operator may energize dynamoelectric machine 41 across line terminals L1, L2 by closing switch 189. In this manner, power is supplied from line terminal L1 through closed switch 189, lead 185 and male terminal 113 of combination starter-protector device 21, its strap 111 and female terminal 129 to plug terminal 27 and therefrom to both start winding 35 and run winding 37 of dynamoelectric machine 41. From start winding 35, current flows through plug terminal 25, female terminal 63 of releasable combination 21, contact place 123, PTCR 43, contact plate 121, strap 109, terminal 93, and bimetal switch element 45 to terminals 91, 107 and therefrom through lead 187 to line terminal L2. At the same time, current also passes in parallel circuit relation from run winding 37 through plug terminal 23 to female terminal 61 of releasable combination 21, and therefrom between strap 109 and line terminal L2 in the same manner as discussed above.

Figure 10:
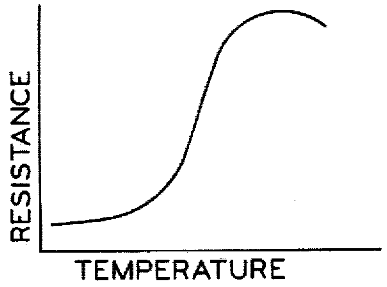
FIG. 10 is an exemplary graphical representation illustrating the relationship of the temperature and resistance characteristics of a positive temperature coefficient resistor (PTCR).

As previously mentioned and as graphically illustrated in FIG. 10, PTCR 43 is operable generally in response to current flow therethrough to increase its resistance generally as a function of its temperature; therefore, assuming the temperature of the PTCR to be rather low at the beginning of the start-up period of dynamoelectric machine 41 when switch 189 is closed, the PTCR will initially pass current at a value sufficiently great enough to effect a desired starting torque of the dynamoelectric machine during the start-up period thereof. As the temperature of PTCR 43 increases in response to the current flow therethrough to the anomaly or transition temperature of the PTCR, its resistance to such current flow also increases to a value which generally renders start winding 35 ineffective in winding circuit 39 of dynamoelectric machine 41 so as to electrically disassociate the start winding from run winding 37. The point of time during the start-up period of dynamoelectric machine 41 at which start winding 35 may be disabled or rendered ineffective, as previously mentioned, may be predetermined so as to generally coincide with the desired running speed of dynamoelectric machine 41. Of course, PTCR 43 will not act to obviate current flow through start winding 35 during the start-up period of dynamoelectric machine 41, but the PTCR will throttle or restrict the passage of such current flow to such a minimal or small value that the start winding is ineffective in winding circuit 39 of the dynamoelectric machine. Of course, when the operator opens switch 189, circuit 183 is interrupted across line terminals L1, L2, and dynamoelectric machine 41 is deenergized.

As well known in the art, overload conditions may deleteriously affect components of a dynamoelectric machine, such as for instance shorting or burning-out of the winding circuit in such dynamoelectric machine. These overload conditions may be effected by a plurality of different causes or by various combinations of such causes. For instance, some of the well known causes of motor overload conditions are: a running overload; a high temperature overload; an overload occasioned by a stalled or locked rotor; and a high current overload. Irrespective of the particular cause or combination of causes effecting an overload condition, a deleteriously high current is drawn by the dynamoelectric machine, and such high current is usually accompanied by or results in a high temperature. Therefore, for the sake of simplifying the discussion of overload conditions herein, it is to be understood that any cause or causes for affecting such an overload condition will be discussed only within the context of a high current draw or current overload condition accompanied by a high temperature condition with respect to winding circuit 39 of dynamoelectric machine 41.

In the event of the occurrence of an overload or high current condition in dynamoelectric machine 41, a relatively large amount of current may be drawn in circuit 183 which could deleteriously affect start and run windings 35, 37, as discussed above. However, bimetal switch element 45 is responsive to the aforementioned high current and temperature increase to correspondingly increase the heat generated thereby and to effect characteristic snap-action of the bimetal switch element to a circuit interrupting position breaking its contacts 99, 101 from stationary contacts 95, 97 of protector terminals 91, 93. In this manner, circuit 183 is opened effecting deenergization of dynamoelectric machine 41 and isolating or electrically disassociating winding circuit 39 of the dynamoelectric machine from the current overload which may then exist in the dynamoelectric machine across line terminals L1, L2.

Of course, the opening of circuit 183 in response to the snap-action movement of bimetal switch element 45, as discussed above, also effects the deenergization and the resultant cooling of PTCR 43. Even with the supplemental heat supplied or radiated for PTCR 43 through chambers 163, 89 in casing 65 and protector housing 81 of combination starter-protector device 21 to bimetal switch element 45, the bimetal switch element may cool sufficiently in its circuit breaking or interrupting position so as to cycle several or a plurality of times between such circuit interrupting position and the circuit completing position thereof. Such cycling of bimetal switch element 45 may occur throughout or over a predetermined relatively short period of time, and such cycling is only effective to replace dynamoelectric machine 41 in circuit relation across line terminals L1, L2 for relatively very short periods of time. When bimetal switch element 45 is so cycled to its circuit completing position, PTCR 43 is, of course, reenergized to again supply heat to the bimetal switch element during the aforementioned relatively short period of time thereby to again effect the cyclical movement or thermal actuation of the bimetal switch element to its circuit interrupting position. Even though bimetal switch element 45 may cycle, as discussed above, for a brief period of time subsequent to the occurrence of the overload conditions in dynamoelectric machine 41, it is believed that the supplemental heat transferred mainly by radiation from PTCR 43 to bimetal switch element 45 is effective to increase the "off-time" thereof, i.e., when the bimetal switch element is in its circuit interrupting position, through the aforementioned predetermined relative short period of time. Thus, it may be noted that the predeterminately increased "off-time" of bimetal switch element 45 ocasioned by the supplemental heat supplied or transferred from PTCR 43 allows the PTCR to cool. As PTCR 43 cools, the resistance thereof is correspondingly reduced generally as a function of the decreasing temperature thereof. When the resistance and temperature of PTCR 43 are reduced to a sufficiently low value, the PTCR will again permit the passage therethrough of the current at a value sufficiently great enough to effect the restarting of dynamoelectric machine 41. Therefore, when bimetal switch element 45 also cools enough to cycle or return to its uninterrupted circuit completing position, current is drawn through PTCR 43 at values great enough to again effect the reenergization of winding circuit 39 in dynamoelectric machine 41 to bring it up to its predetermined running speed, as discussed hereinabove. When dynamoelectric machine 41 is so reenergized to attain its running speed, the self-heating effect of PTCR 43 once again raises its temperature and its resistance value as a function thereof to reduce the current flow therethrough to a value again rendering start winding 35 ineffective in winding circuit 39 of dynamoelectric machine 41. Thus, the restarting of dynamoelectric machine 41 assumes that the cause of the overload condition has been alleviated or corrected, and if not so alleviated, combination starter-protector device 21 may again operate or function to open circuit 183 taking dynamoelectric machine 41 off the line across line terminals L1, L2, as previously described.

In view of the foregoing, it is now apparent that a novel combination starter-protector device 21 and a novel method of assembling such have been presented meeting the objects set out herein, as well as others, and it is contemplated that changes as to the precise arrangements, configurations, details and connections of the components of such combination starter-protector device and also as to the precise order of the method steps of such assembling methods may be made by those having ordinary skill in the art without departing from the spirit of the invention or the scope thereof as illustrated in the claims which follow.

What we claim as new and desire to secure by Letters Patent of the United States is:

1. A combination starter-protector device adapted for removable association in electrical engagement with a first pair of male terminals respectively connected in circuit relation with a winding circuit of a dynamoelectric machine, the combination starter-protector device comprising:

- a casing including a plurality of casing members arranged at least in part in overlaying relation and defining a chamber within said casing;
- a protector device housing disposed within said chamber and captured between at least a pair of said casing members;
- a bimetal switch element mounted in said protector device housing;
- a second pair of male terminals arranged in seating engagement with one of said casing members of said at least pair thereof within said chamber and connected in circuit relation with said bimetal switch element, respectively;
- passage means extending through a third one of said casing members and communicating with said chamber for providing access to said second male terminal pair from exteriorly of said casing;
- a pair of female terminal means captured between said one casing member and the other of said casing members of said at least pair thereof and adapted for the removable association in the electrical engagement with the first male terminal pair, respectively;
- a pair of spaced apart contact plates disposed within said chamber at least adjacent said protector housing and electrically connected with said female terminal means, respectively;
- a PTCR disposed in electrical contacting engagement between said contact plates and arranged in thermal coupling relation said bimetal switch element; and
- means for releasably securing said one housing member, said other housing member and said third one housing member in displacement preventing engagement with each other, said releasably securing means including a pair of bosses on one of said one and other casing members, a pair of recess means in the other of said one and other casing members for receiving said bosses, respectively, a pair of latches on said one and other casing members, respectively, and a pair of means associated with said third one casing member for latching engagement with said latches, respectively.

2. A combination starter-protector device adapted for connection in circuit relation with a winding circuit of a dynamoelectric machine comprising:

- a casing including a plurality of separable casing members arranged in a preselected assembly position with each other;
- a PTCR disposed within said casing;
- a bimetal switch element within said casing and arranged in thermal coupling relation with said PTCR; and
- means for releasably securing said casing members against separation from the preselected assembly position thereof, said releasably securing means including guide means respectively associated with a pair of said casing members for effecting separation therebetween generally only in opposite directions, means respectively associated with a third one of said casing members and at least one of said casing members of said pair thereof for interlocking in engagement therebetween when said casing members are in the preselected assembly position thereof, and said third one casing member being arranged at least in part in overlaying relation with said casing member pair so as to obviate separation thereof in the opposite directions when said interlocking means is engaged.

3. A combination starter-protector device as set forth in claim 2 wherein said guide means includes at least one boss on one of said at least one casing member and the other of said casing members of said pair thereof, and at least one means associated with the other of said at least one casing member and said other casing member for guidably receiving said at least one boss generally in only the opposite directions.

4. A combination starter-protector device as set forth in claim 2 wherein said interlocking means comprises a latch on said at least one casing member, and a slot in said third one casing member arranged in displacement preventing engagement with said latch when said casing members are in the preselected assembly position thereof.

5. A combination starter-protector device as set forth in claim 2 wherein said interlocking means comprises a pair of latches on said third one casing member and said at least one casing member, respectively, said latches being arranged in displacement preventing engagement when said casing members are in the preselected assembly position thereof.

6. A combination starter-protector device as set forth in claim 2 further comprising means respectively on said third one casing member and said at least one casing member for wedging in engagement so as to releasably retain said interlocking means against disengagement.

7. A combination starter-protector device as set forth in claim 6 further comprising means extending through said third one casing means adapted for the passage therethrough of a tool to effect the disengagement of said wedging means.

8. A combination starter-protector device adapted for removable mounting in electrical engagement onto a pair of male mounting terminals connected in circuit relation with a winding circuit of a dynamoelectric machine comprising:

- three separable casing members associated in a preselected assembly position and defining therein a chamber, one of said casing members including a pair of opposite portions arranged at least in part in overlaying relation with the other two casing members so as to obviate separation therebetween when said three casing members are in the preselected assembly position thereof, and means respectively associated with at least one of said opposite portions and at least one of said other two casings for releasably interlocking in engagement so as to maintain said one casing member against separation from said other two casing members;

a pair of female terminal means captured between said other two casing members and adapted for the removable mounting in the electrical engagement with the male mounting terminals;

a PTCR disposed in said chamber and including a pair of opposite contact sides respectively electrically connected with said female terminal means; and a bimetal switch element arranged in thermal coupling relation with said PTCR.

9. A combination starter-protector device adapted for connection in circuit relation with a winding circuit of a dynamoelectric machine and adapted for receiving in circuit relation a means for releasable electrical connection, the combination starter-protector device comprising:

a casing having a plurality of wall means defining therein a chamber;

a PTCR disposed in said chamber;

a bimetal switch element arranged in said chamber in thermal coupling relation with said PTCR;

a pair of recesses in at least one of said wall means and enclosed within said chamber;

a pair of male terminals disposed entirely within said chamber with at least one of said male terminals connected in circuit relation with said bimetal switch element, said male terminals including a pair of means extending into said recesses in releasable engagement therewith for predeterminately locating said male terminals with respect to each other within said chamber, respectively; and means in another of said wall means and intersecting with said chamber adapted for the passage therethrough from exteriorly of said casing at least in part into said chamber of the releasable electrical connection means into circuit relation with said male terminals, respectively.

10. A combination starter-protector device as set forth in claim 9 further comprising a protector device housing disposed in said chamber between said PTCR and said male terminal pair, said bimetal switch element being disposed in said housing, and said male terminal pair further including a pair of means for supporting engagement with said housing.

11. A combination starter-protector device as set forth in claim 9 wherein said male terminal pair further include a pair of electrical connector sections within said chamber and extending in spaced relation generally toward said passage means in alignment therewith.

12. A combination starter-protector device as set forth in claim 9 further comprising a pair of female terminals extending through said another wall means, and means within said chamber for connecting one of said female terminals in circuit relation with said bimetal switch element.

13. A combination starter-protector device as set forth in claim 9 further comprising a female terminal disposed in said casing so as to be accessible from exteriorly thereof, and means within said chamber for connecting said female terminal in circuit relation with the other of said male terminals.

14. A combination starter-protector device adapted for connection in circuit relation with a winding circuit of a dynamoelectric machine and adapted for receiving a tool manipulated by an operator, the combination starter-protector device comprising:

a casing including a plurality of separable casing members releasably secured together in interlocking engagement;

a PTCR and a bimetal switch element arranged in thermal coupling relation with each other in said casing;

a pair of means interiorly of said casing on a pair of said casing members and releasably associated with each other for maintaining said casing members against separation from the interlocking engagement thereof; and passage means in one of said casing members arranged with respect to said maintaining means for receiving therethrough the tool adapted to engage at least one of said maintaining means and interrupt the association thereof with the other of said maintaining means.

15. A method of assembling a combination starter-protector device having a PTCR, a bimetal switch element, and a casing therefor comprising a plurality of separable casing members, the method comprising the steps of:

arranging both the PTCR and the bimetal switch element in thermal coupling relation generally between a pair of the casing members; and associating another one of the casing members at least in part in overlaying relation with the casing member pair exteriorly thereof and releasably securing at least a pair of means disposed on at least one casing member of the casing member pair and the another one casing member for interlocking in engagement with each other so as to releasably maintain the casing member pair and the another one casing member in a preselected assembly position against separation therefrom.

16. A method of assembling a combination starter-protector device having a PTCR, a bimetal switch element and a casing therefor including a plurality of separable casing members, the method comprising the steps of:

arranging both the PTCR and the bimetal switch element in thermal coupling relation with each other in at least one of the casing members of the plurality thereof and associating another of the casing members of the plurality thereof so that the at least one casing member and the another casing member are separable from each other generally only in opposite directions;

overlaying respective parts of a third one of the casing members of the plurality thereof with each of the at least one casing member and the another casing member so as to obviate separation thereof in the opposite directions; and interlocking the third one casing member with at least one of the at least one casing member and the another casing member.

17. A combination starter-protector device adapted for connection in circuit relation with a winding circuit of a dynamoelectric machine, the device comprising:

a casing including three separable casing members associated in a preselected assembly position and defining in said casing a chamber, one of said casing members including a pair of opposite wall means arranged exteriorly of the other two casing members in overlaying relation so as to obviate separation therebetween when said three casing members are in the preselected assembly position thereof, and means associated with at least one of said opposite wall means and at least one of said two other casing members for releasably maintaining said one casing member against separation from said other two casing members;

a PTCR disposed in said chamber; and switch means arranged in said chamber for thermal coupling relation with said PTCR.

18. A combination starter-protector device as set forth in claim 17 wherein said releasably maintaining means comprises means for interlocking in releasable engagement.

19. A combination starter-protector device as set forth in claim 18 further comprising a pair of means within said chamber on said one casing member and one of said at least one of said two casing members and the other thereof and releasably associated with each other for retaining said interlocking means in the releasable engagement.

20. A combination starter-protector device as set forth in claim 19 wherein the device is adapted to receive a tool manipulated by an operator, and wherein the device further comprises means in one of said one casing member, said at least one of said other two casing members and said other of said other two casing members for the passage therethrough of the tool by the operator to engage at least one of said retaining means and interrupt the association thereof with the other of said retaining means.

21. A combination starter-protector device as set forth in claim 19 further comprising resilient means mounted to one of said one casing member, said at least one of said other two casing members and said other of said other two casing members and adapted for releasable engagement with a part associated with the dynamoelectric machine when the device is connected in the circuit relation with the winding circuit of the dynamoelectric machine.

22. A combination starter-protector device adapted for connection in circuit relation with a winding circuit of a dynamoelectric machine and adapted for receiving a disassembling tool, the combination starter-protector device comprising:

a casing including a plurality of separable casing members arranged in a preselected assembly position and defining a chamber within said casing;

means for interlocking said casing members in releasable engagement when said casing members are in the preselected assembly position thereof;

means releasably associated within said chamber for maintaining said interlocking means in the releasable engagement thereof;

means in said casing for receiving the disassembly tool adapted to engage and releasably disassociate said maintaining means;

a PTCR disposed in said chamber; and switch means in said chamber and adapted for thermal coupling relation with said PTCR.

23. A combination starter-protector device as set forth in claim 22 further comprising resilient means mounted to said casing exteriorly thereof adapted for releasable securing engagement with apparatus associated with the dynamoelectric machine when the device is connected in the circuit relation with the winding circuit of the dynamoelectric machine.

24. A combination starter-protector device adapted for connection in circuit relation with a winding circuit of a dynamoelectric machine and adapted for receiving a disassembly tool, the combination starter-protector device comprising:

a casing including a plurality of separable casing members arranged in a preselected assembly position and defining a chamber in said casing;

means associated with said casing members for interlocking in releasable engagement to prevent the separation of said casing members from the preselected assembly position thereof;

a pair of means within said chamber arranged on a pair of said casing members and releasably associated with each other for maintaining said interlocking means in the releasable engagement thereof;

means in one of said casing members of said pair thereof for the passage therethrough into said chamber of the disassembly tool into engagement with at least one of said maintaining means to effect the disassociation of said maintaining means;

PTCR in said chamber; and switch means in said chamber and adapted for thermal coupling relation with said PTCR.

25. A combination starter-protector device as set forth in claim 24 further comprising means associated with the other of said casing members of said pair thereof and another one of said casing members for effecting the separation thereof only in opposite directions.

26. A combination starter-protector device as set forth in claim 25 wherein said interlocking means includes a pair of means on said one casing member for respectively overlaying at least a part of said other casing member and said another one casing member to obviate the separation thereof in the opposite directions when said casing members are in the preselected assembly position thereof.

27. A combination starter-protector device as set forth in claim 26 wherein said interlocking means further includes a pair of latching means on at least one of said overlaying means and at least one of said other casing member and said another one casing member for releasable engagement with each other to obviate the separation of said one casing member from said other casing member and said another one casing member when said casing members are in the preselected assembly position thereof.

* * * * *